United States Patent
Tahira et al.

(10) Patent No.: US 10,732,142 B2
(45) Date of Patent: Aug. 4, 2020

(54) GAS SENSOR

(71) Applicant: NGK SPARK PLUG CO., LTD., Nagoya-shi, Aichi (JP)

(72) Inventors: Daisuke Tahira, Komaki (JP); Shingo Ito, Ichinomiya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 69 days.

(21) Appl. No.: 15/878,591

(22) Filed: Jan. 24, 2018

(65) Prior Publication Data
US 2018/0217088 A1 Aug. 2, 2018

(30) Foreign Application Priority Data
Jan. 27, 2017 (JP) ................................. 2017-012755

(51) Int. Cl.
*G01N 27/407* (2006.01)
*G01D 11/24* (2006.01)
(Continued)

(52) U.S. Cl.
CPC ....... *G01N 27/4078* (2013.01); *G01D 11/245* (2013.01); *G01N 27/4067* (2013.01);
(Continued)

(58) Field of Classification Search
CPC ............. G01N 27/407; G01N 27/4074; G01N 27/4077; G01N 27/4078
See application file for complete search history.

(56) References Cited

U.S. PATENT DOCUMENTS

| 8,460,526 B2 * | 6/2013 | Kamiya | G01N 27/4078 204/410 |
| 2006/0237315 A1 * | 10/2006 | Matsuo | G01N 27/4062 204/424 |

(Continued)

FOREIGN PATENT DOCUMENTS

| JP | 2002-071626 A | 3/2002 |
| JP | 2006-308328 A | 11/2006 |

(Continued)

OTHER PUBLICATIONS

Communication dated May 18, 2020, from the Japanese Patent Office in Application No. 2017-012755.

*Primary Examiner* — Luan V Van
*Assistant Examiner* — Caitlyn Mingyun Sun
(74) *Attorney, Agent, or Firm* — Sughrue Mion, PLLC

(57) ABSTRACT

A gas sensor (100) includes a sensor element (120), a metallic shell (110), a powder filler member (133), a first ceramic holder (135) in contact with the rear end of the powder filler member and from which the sensor element protrudes, and a second ceramic holder (131) in contact with the forward end of the powder filler member and from which the sensor element protrudes. The powder filler member has a higher thermal expansion coefficient than that of the first and second ceramic holders. The first ceramic holder, powder filler member, and second ceramic holder are pressed by force application means (118). A relation $0.40 < (L-M)/L < 0.58$ holds, where L is the axial distance between the rearward-facing surface of the first ceramic holder and the forward end of the second ceramic holder, and M is the axial length of the powder filler member.

4 Claims, 4 Drawing Sheets

(51) Int. Cl.
*G01N 27/406* (2006.01)
*G01M 15/10* (2006.01)

(52) U.S. Cl.
CPC ..... *G01N 27/4073* (2013.01); *G01N 27/4077* (2013.01); *G01M 15/104* (2013.01)

(56) References Cited

U.S. PATENT DOCUMENTS

2012/0325661 A1* 12/2012 Kume ................ G01N 27/4074
 204/424
2015/0330939 A1* 11/2015 Tahira ................ G01N 27/4078
 29/25.03

FOREIGN PATENT DOCUMENTS

JP 2013-15511 A 1/2013
JP 2015-232544 A 12/2015

* cited by examiner

GAS SENSOR

BACKGROUND OF THE INVENTION

1. Field of the Invention

The present invention relates to a gas sensor used to detect the concentration of a specific gas component contained in a combustion gas or exhaust gas of, for example, a combustor or an internal combustion engine.

2. Description of the Related Art

A gas sensor for detecting the concentration of a specific component (such as oxygen) in exhaust gas from an internal combustion engine is known (see Patent Document 1). This gas sensor contains an axially extending sensor element, and the sensor element is held inside a metallic shell. A ceramic holder, talc powder, and a ceramic sleeve are disposed in this order from a forward end side between the sensor element and the metallic shell. A crimp portion formed at the rear end of the metallic shell is crimped forward to a rear end portion of the ceramic sleeve. The talc powder is thereby compressed, and the gap between the sensor element and the metallic shell is sealed.

[Patent Document 1] Japanese Patent Application Laid-Open (kokai) No. 2002-71626 (paragraphs [0054] and [0066])

3. Problems to be Solved by the Invention

As shown in FIG. 3, when a gas sensor is heated to high temperature by, for example, exhaust gas, the metallic shell thermally expands, and the pressing force produced as a result of crimping decreases. In this case, the degree of compression of the talc powder becomes insufficient, whereby sealing performance deteriorates.

One possible measure against this problem is to increase the crimping force to thereby increase the pressing force acting on the talc powder. However, as the sensor element is reduced in size, its withstanding pressure decreases. In this case, as shown in FIG. 3, when the crimping force is increased, the pressing force may exceed the withstanding pressure of the sensor element, causing the sensor element to break.

Patent Document 1 proposes to replace the ceramic holder and the ceramic sleeve with metallic members formed of, for example, stainless steel having the same thermal expansion coefficient as the metallic shell. In this case, these metallic members thermally expand similarly to the metallic shell, so that the pressing force produced as a result of crimping is maintained. However, this is not easily implemented because replacing the ceramic holder and the ceramic sleeve with the metallic members increases cost.

SUMMARY OF THE INVENTION

It is therefore an object of the present invention to provide a gas sensor which prevents breakage of the sensor element and deterioration in sealing performance at high temperatures.

The above object of the invention has been achieved by providing (1) a gas sensor comprising a sensor element that extends in a direction of an axial line and includes a detection section disposed at a forward end thereof; a tubular metallic shell that internally holds the sensor element; a powder filler member that is formed of an inorganic material and seals a gap between the sensor element 120 and the metallic shell; a tubular first ceramic holder that is in contact with a rear end of the powder filler member and disposed between the sensor element and the metallic shell, the sensor element protruding rearward from the first ceramic holder; and a tubular second ceramic holder that is in contact with a forward end of the powder filler member and disposed between the sensor element and the metallic shell, the sensor element protruding forward from the second ceramic holder. The powder filler member has a higher thermal expansion coefficient than that of the first ceramic holder and the second ceramic holder. The first ceramic holder, the powder filler member, and the second ceramic holder are fixed while being pressed by force application means from a rear end side of the metallic shell toward a forward end side of the metallic shell. The force application means includes a rear end portion of the metallic shell which is bent inward to apply pressing force directly or indirectly to a rearward-facing surface of the first ceramic holder. A relation $0.40 < (L-M)/L < 0.58$ holds, where L is a distance, in the direction of the axial line, between the rearward-facing surface of the first ceramic holder and a forward end of the second ceramic holder, and M is a length of the powder filler member in the direction of the axial line.

In the gas sensor (1) above, the ratio of the effective axial length (L−M) of the first ceramic holder and the second ceramic holder each having a lower thermal expansion coefficient than that of the powder filler member to the overall pressing length L can be set appropriately. This reduces the rate of reduction in pressing force when the gas sensor is heated to a high temperature. It is therefore unnecessary to increase the pressing force acting on the powder filler member so as to prevent deterioration in sealing performance at high temperatures while also preventing sensor element breakage.

In a preferred embodiment (2) of the gas sensor (1) of the present invention, a rear end of the first ceramic holder is flush with a rear end of the force application means or is located forward of the rear end of the force application means.

In the gas sensor (2), a holding length over which the sensor element is held by the first ceramic holder is not excessively large. Therefore, even when the center axis of the sensor element is misaligned with the center axis of the first ceramic holder during assembly, the sensor element is unlikely to break.

In another preferred embodiment (3) of the gas sensor (1) or (2) of the present invention, the length of the second ceramic holder in the direction of the axial line is larger than the length of the first ceramic holder in the direction of the axial line.

In the gas sensor (3), even when, for example, high-temperature exhaust gas is transferred from the forward end side of the gas sensor, heat is less likely to be transferred to the powder filler member. This is because the axial length of the second ceramic holder located forward of the powder filler member is longer. Thus, the deterioration in sealing performance due to thermal deterioration of the powder filler member can be further prevented.

Effects of the Invention

According to the present invention, a gas sensor which prevents deterioration in sealing performance at high temperatures while also preventing sensor element breakage can be obtained.

DESCRIPTION OF REFERENCE NUMERALS AND SYMBOLS

Figure 1:
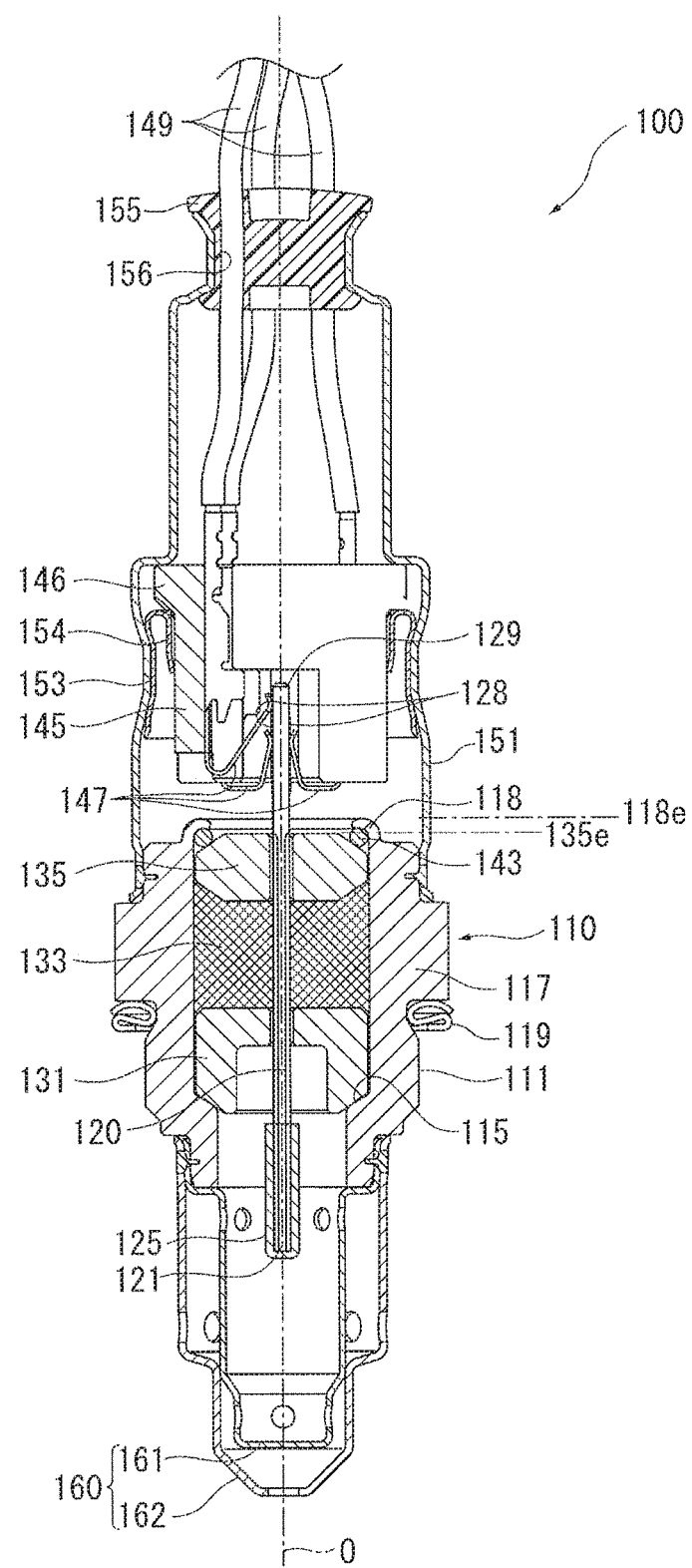
FIG. 1 is a cross-sectional view of a gas sensor (oxygen sensor) according to an embodiment of the present invention, the cross section being taken in the axial direction of the gas sensor.

Reference numerals and symbols used to identify various features in the drawings include the following.

100: gas sensor
110, 310: metallic shell
118, 340: force application means
118e: rear end of the force application means
120: sensor element
121: detection section
131, 231, 331: second ceramic holder
133, 233, 333: powder filler member
135, 235, 335: first ceramic holder
135e: rear end of the first ceramic holder
O: axial line
L: axial length between the rearward-facing surface of the first ceramic holder and the forward end of the second ceramic holder
M: axial length of the powder filler member
T1: axial length of the first ceramic holder
T2: axial length of the second ceramic holder

DETAILED DESCRIPTION OF THE PREFERRED EMBODIMENTS

Embodiments of the present invention will next be described in greater detail with reference to the drawings. However, the present invention should not be construed as being limited thereto.

FIG. 1 is a cross-sectional view of a gas sensor (oxygen sensor) 100 of an embodiment of the present invention. The cross section is taken in the direction of an axial line O of the oxygen sensor 100. In FIG. 1, the lower side is an axially forward end side (hereinafter referred to as a forward end side), and the upper side is an axially rear end side (hereinafter referred to as a rear end side).

The oxygen sensor 100 is attached to an unillustrated exhaust system of an automobile, and a detection section 121 of a sensor element 120 held inside the oxygen sensor 100 is exposed to exhaust gas (gas to be detected) to measure the concentration of oxygen (a specific gas component) in the exhaust gas.

As shown in FIG. 1, the oxygen sensor 100 includes a tubular metallic shell 110 extending in the axial direction (the direction along the axial line O, the vertical direction in FIG. 1); the plate-shaped sensor element 120 being held inside the metallic shell 110; a second ceramic holder 131, a powder filler member (talc powder) 133, and a first ceramic holder 135 which are disposed between the sensor element 120 and the metallic shell 110; an outer tube 151 fixed to the rear end of the metallic shell 110; a double wall protector 160 attached to the forward end of the metallic shell 110; etc.

The sensor element 120 has an axially extending plate shape (strip shape), and its forward end portion serves as the detection section 121 that detects an oxygen gas component in the exhaust gas. The sensor element 120 includes: a plate-shaped gas detector that has a well-known structure and detects the concentration of oxygen; and a plate-shaped heater (not shown) for heating and rapidly activating the gas detector. The gas detector and the heater are bonded together to integrate the same. The gas detector includes an oxygen ion conductive solid electrolyte body formed mainly of zirconia and a pair of electrodes (a detection electrode and a reference electrode) formed mainly of platinum, and the pair of electrodes are disposed in the detection section 121.

Moreover, a protective layer 125 is disposed so as to cover the outer surface of the detection section 121, in order to protect the detection electrode from poisoning by, for example, oil contained in the measurement gas. Five electrode pads 128 (three of them are shown in FIG. 1) serving as electrodes of the gas detector and the heater are formed on a rear end portion 129 of the sensor element 120.

In a space rearward of the protective layer 125 of the sensor element 120, the alumina-made second ceramic holder 131, the talc powder 133, and the first ceramic holder 135 are disposed in this order from the forward end side with the sensor element 120 passing therethrough. The talc powder 133 is crushed and fills every corner of the gap between the sensor element 120 and the metallic shell 110, and the circumference of the sensor element 120 is thereby surrounded and held by the tubular metallic shell 110.

The metallic shell 110 is formed of SUS430 and used to fix the oxygen sensor 100 to, for example, an exhaust pipe of an automobile. A male threaded portion 111 for attachment to the exhaust system is formed on a forward end portion of the outer circumference of the metallic shell 110. The protector 160 is fixed to a portion of the metallic shell 110, which portion is located forward of the male threaded portion 111.

A tool engagement portion 117 for engaging an attachment tool is formed in a central portion of the outer circumference of the metallic shell 110. A gasket 119 is fitted to a portion of the metallic shell 110 located between the tool engagement portion 117 and the male threaded portion 111. The outer tube 151 is fixed to a portion of the metallic shell 110, which portion is located rearward of the tool engagement portion 117, and force application means (crimp portion) 118 that is crimped to hold the sensor element 120 within the metallic shell 110 is formed rearward of the portion to which the outer tube 151 is fixed.

A step portion 115 having a diameter decreasing toward the forward end side is formed on a forward end portion of the inner circumference of the metallic shell 110. A tapered forward end peripheral edge of the second ceramic holder 131 engages the step portion 115.

The talc powder 133 is disposed rearward of the second ceramic holder 131 within the metallic shell 110 with the sensor element 120 passing through the talc powder 133. The tubular first ceramic holder 135 is fitted into the metallic shell 110 so as to press the talc powder 133 from the rear end side. A radially outer portion of the rearward-facing surface of the first ceramic holder 135 is chamfered, and an annular crimp packing 143 is disposed on the chamfered portion. The crimp portion 118 of the metallic shell 110 is crimped so as to press the chamfered portion of the first ceramic holder 135 through the crimp packing 143 toward the forward end side.

The talc powder 133 pressed by the first ceramic holder 135 is crushed within the metallic shell 110 and fills every corner, and the sensor element 120 is held in position within the metallic shell 110 through the talc powder 133. The airtightness of the metallic shell 110 is maintained by the crimp packing 143 interposed between the crimp portion 118 and the first ceramic holder 135, and gas leakage is thereby prevented.

The rear end portion 129 of the sensor element 120 protrudes rearward from the crimp portion 118, which is a rear end portion of the metallic shell 110. The rear end portion 129 is capped with a tubular separator 145 made of insulating ceramic. The separator 145 internally holds five connection terminals 147 (three of them are shown in FIG. 1) for electrical connection with the five electrode pads 128 formed on the rear end portion 129 of the sensor element 120. Also, the separator 145 accommodates joint portions between the connection terminals 147 and five lead wires 149 (three of them are shown in FIG. 1) extending to the outside of the oxygen sensor 100 such that the joint portions are insulated from each other.

The outer tube 151 is disposed so as to surround the separator 145. The outer tube 151 is made of stainless steel (SUS304 in the present embodiment), and its forward opening portion is disposed radially outward of the rear end portion of the metallic shell 110. The forward opening portion is crimped from the outside, and laser-welding is performed around the entire outer circumference of the forward opening portion, whereby the forward opening portion is joined to the metallic shell 110.

A metallic tubular holding member 153 is disposed in a space between the outer tube 151 and the separator 145. The holding member 153 has a support portion 154 formed by bending its rear end portion inward. The support portion 154 engages a flange portion 146 formed on a rear end portion of the outer circumference of the separator 145 inserted into the holding member 153 to thereby support the separator 145.

The outer tube 151 is reduced in diameter in a portion rearward of the separator 145. The rearward-facing surface of the separator 145 engages the reduced diameter portion of the outer tube 151. Movement of the separator 145 in the direction of the axial line O is thereby prevented, and the separator 145 is held by the support portion 154. A portion of the outer tube 151 that is located outward of the holding member 153 is crimped inward together with the holding member 153. Thus, the holding member 153 supporting the separator 145 is fixed to the outer tube 151.

A fluororubber-made grommet 155 is fitted into a rear opening of the outer tube 151. The grommet 155 has five insertion holes 156 (one of them is shown in FIG. 1), and the five lead wires 149 extending from the separator 145 are airtightly passed through the respective insertion holes 156. The outer tube 151 is crimped from the outside, whereby the grommet 155 in the above state is fixed to the outer tube 151 while pressing the separator 145 toward the forward end side.

The detection section 121 of the sensor element 120 held by the metallic shell 110 protrudes forward beyond the second ceramic holder 131 and the metallic shell 110. The protector 160 for protecting the detection section 121 from contamination, water, etc., is fitted onto a forward end portion of the metallic shell 110 and fixed by laser welding. The protector 160 has a double structure including a closed-bottom tubular inner protector 161 and an outer protector 162 located outward of the inner protector 161 and containing the inner protector. The inner protector 161 and the outer protector 162 have appropriate gas introduction holes and gas discharge holes, so that the exhaust gas (gas to be detected) can flow into and out of the protector 160.

The forward-facing surface of the second ceramic holder 131 includes a forward end peripheral edge portion tapered forward and a recessed portion located on the center side in relation to the forward end peripheral edge portion and recessed toward the rear end side. An insertion hole for the sensor element 120 passes through the center of the recessed portion. A rearward-facing surface of the second ceramic holder 131 has a flat central portion, and the peripheral edge of the rearward-facing surface is chamfered.

The forward-facing surface and rearward-facing surface of the first ceramic holder 135 have flat central portions, and their peripheral edges are chamfered. The rear end (rearmost end) 135e of the first ceramic holder 135 is located forward of the rear end (rearmost end) 118e of the crimp portion 118.

Figure 2:
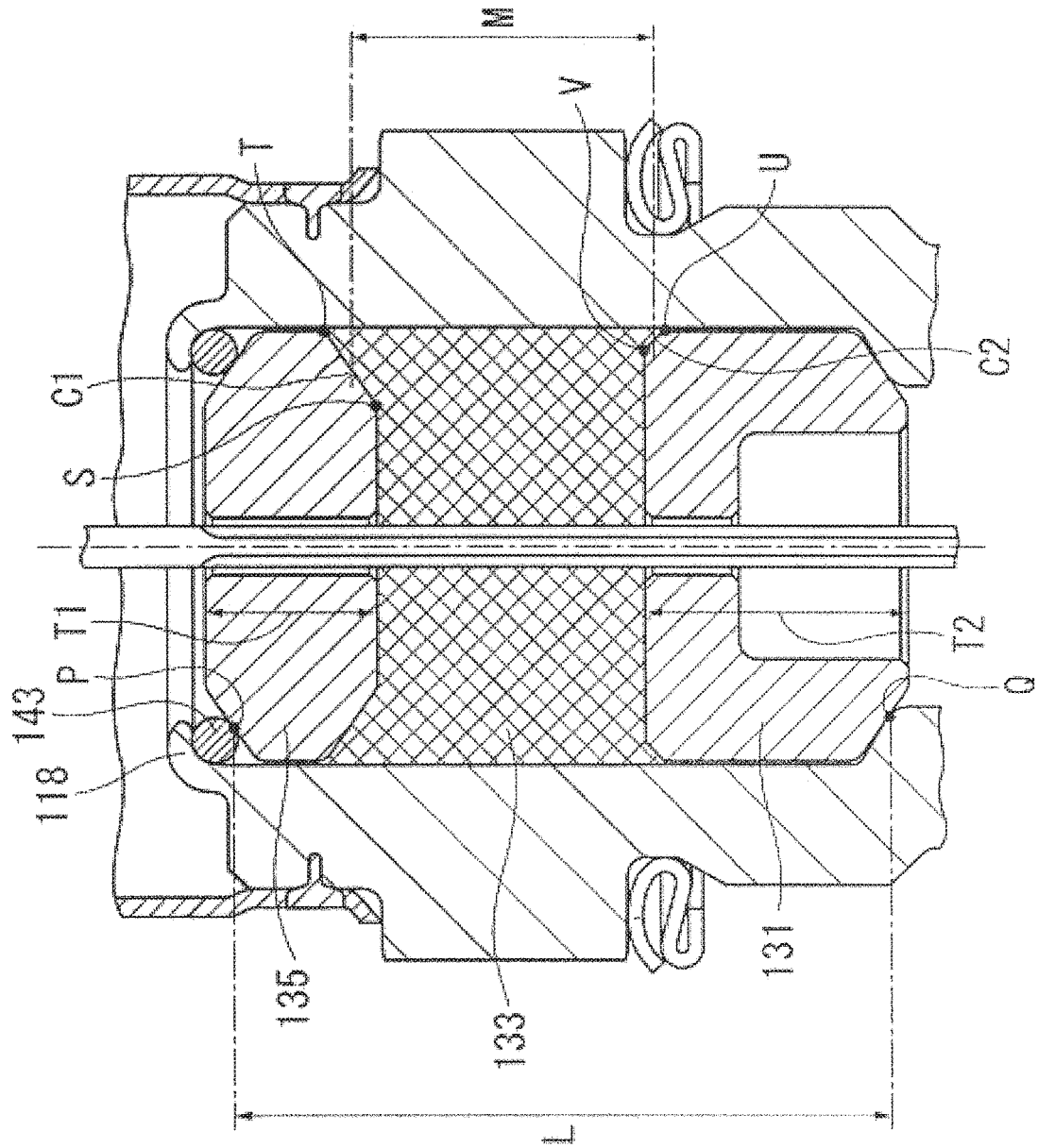
FIG. 2 is a partial enlarged view of FIG. 1.

Referring next to FIG. 2, the relation between the first ceramic holder 135, the talc powder 133, and the second ceramic holder 131, which is a characteristic feature of the present invention, will be described. FIG. 2 is a partial enlarged view of FIG. 1.

The talc powder 133 is formed of an inorganic material having a higher thermal expansion coefficient than that of the first ceramic holder 135 and the second ceramic holder 131. For example, in the present embodiment, the talc powder 133 is talc, and the first ceramic holder 135 and the second ceramic holder 131 are formed of alumina.

Given that L is the distance, in the direction of the axial line O, between the rearward-facing surface of the first ceramic holder 135 and the forward end of the second ceramic holder 131, and M is the length of the talc powder 133 in the direction of the axial line O, the relation $0.40 < (L-M)/L < 0.58$ is satisfied.

Here, the length L is the overall compression length from the first ceramic holder 135 to the second ceramic holder 131 in the direction of the axial line O. The length (L−M) is the effective length (in the direction of the axial line O) of portions of the first ceramic holder 135 and the second ceramic holder 131, which portions take part in pressing (compressing) of the talc powder 133.

Therefore, (L−M)/L is the ratio of the effective length (L−M) of the first ceramic holder 135 and the second ceramic holder 131 to the overall pressing length L. The larger the ratio, the larger the total length of the first ceramic holder 135 and the second ceramic holder 131 with respect to the length of the talc powder 133.

In computing the length L, the "rearward-facing surface" of the first ceramic holder 135 is the rearmost point of a portion of the first ceramic holder 135 pressed by the force application means (crimp portion) 118. This is because a region of the first ceramic holder 135 that is located rearward of the portion directly or indirectly pressed by the crimp portion 118 (i.e., an unpressed region) is not subject to pressing by the crimp portion 118.

For example, in FIG. 2, the pressing force of the crimp portion 118 is indirectly applied to the first ceramic holder 135 through the crimp packing 143. Since the crimp packing 143 is deformed and has a flat surface, the rearmost point P of the contact surface between the crimp packing 143 and the first ceramic holder 135 is regarded as the "rearward-facing surface."

Similarly, in computing the length L, the "forward end" of the second ceramic holder 131 is the forwardmost point of a portion of the second ceramic holder 131, which portion is in direct or indirect contact with the metallic shell 110. This is because the pressing force of the crimp portion 118 does not act on a region of the second ceramic holder 131 that is located forward of the portion in contact with the metallic shell 110 (i.e., an unpressed region) and this region is not subject to pressing by the crimp portion 118.

For example, in FIG. 2, the "forward end" of the second ceramic holder 131 is the forwardmost point Q of the contact surface between the second ceramic holder 131 and the step portion 115 on the inner circumference of the metallic shell 110.

In computing the length M, the rear end of the talc powder 133 in the direction of the axial line O is the midpoint C1, in the direction of the axial line O, between the forwardmost end S and rearmost end T of a portion of the first ceramic holder 135 in contact with the talc powder 133.

The reason is as follows. In the present embodiment, the forward-facing surface of the first ceramic holder 135 has a tapered shape or is chamfered. In many cases, the forward-facing surface is not a simple flat surface. When the forwardmost end S or the rearmost end T is regarded as the "forward end" of the first ceramic holder 135, the length M may be estimated to be too small or too large.

Similarly, in computing the length M, the forward end of the talc powder 133 in the direction of the axial line O is the midpoint C2, in the direction of the axial line O, between the forwardmost end U and rearmost end V of a portion of the second ceramic holder 131 in contact with the talc powder 133.

When $0.40 < (L-M)/L < 0.58$ is satisfied, the ratio of the effective length $(L-M)$, in the direction of the axial line O, of the first ceramic holder 135 and the second ceramic holder 131 having a lower thermal expansion coefficient than that of the talc powder 133 can be set appropriately.

Figure 3:
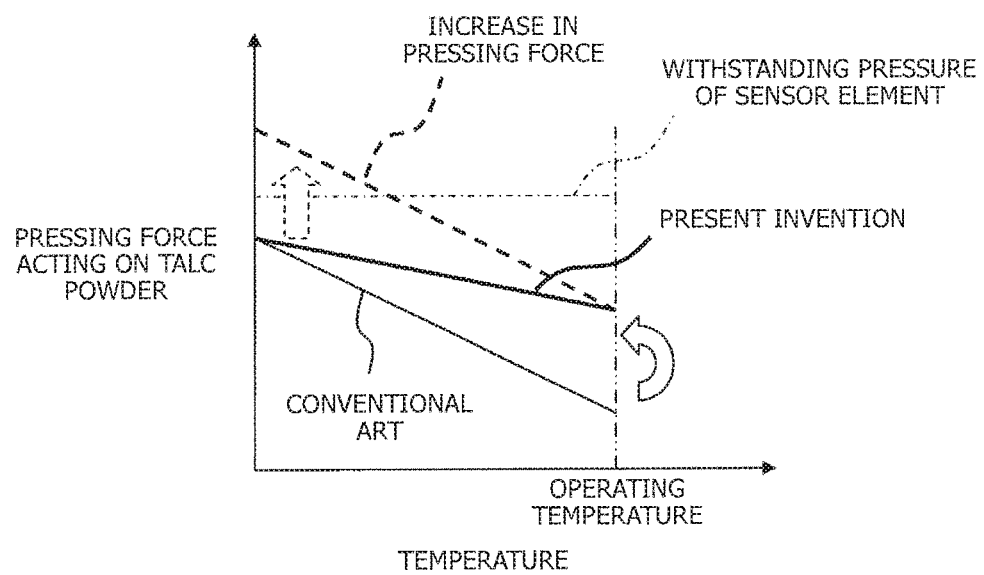
FIG. 3 is an illustration showing the relation between the temperature of the gas sensor and pressing force acting on talc powder.

This reduces the rate of reduction in pressing force when the gas sensor is heated to a high temperature, as shown in FIG. 3. It is therefore unnecessary to increase the pressing force acting on the talc powder 133, so as to prevent deterioration in sealing performance at high temperatures while preventing sensor element 120 breakage.

When $(L-M)/L \leq 0.40$, the effective length $(L-M)$ of the first ceramic holder 135 and the second ceramic holder 131 is small with respect to the pressing length L, i.e., the length M of the talc powder 133 is excessively large with respect to the pressing length L. In this case, an excessively large load may be applied to the sensor element 120 when the talc powder 133 is compressed, and the sensor element 120 may break.

When $(L-M)/L \geq 0.58$, the length M of the talc powder 133 is excessively small with respect to the pressing length L. In this case, the sealing length is small, and this causes a deterioration in sealing performance at high temperatures.

As shown in FIG. 2, in the present embodiment, the length T2 of the second ceramic holder 131 in the direction of the axial line O is larger than the length T1 of the first ceramic holder 135 in the direction of the axial line O.

In this case, even when, for example, high-temperature exhaust gas is transferred from the forward end side of the oxygen sensor 100, heat is less likely to be transferred to the talc powder 133. This is because the length T2, in the direction of the axial line O, of the second ceramic holder 131 located forward of the talc powder 133 is longer. Consequently, the deterioration in sealing performance due to thermal deterioration of the talc powder 133 can be further prevented.

The lengths T1 and T2 are the lengths of the first ceramic holder 135 and the second ceramic holder 131, respectively, between their forward and rear ends. This is because, in the case where the transfer of heat in the direction of the axial line O is controlled by setting the length T2 to be larger than the length T1, the lengths (in the direction of the axial line O) of the portions of the first ceramic holder 135 and the second ceramic holder 131, which portions take part in generating the pressing force, do not influence control of heat transfer. However, the net lengths of the first ceramic holder 135 and the second ceramic holder 131 do influence the control of heat transfer.

Figure 4:
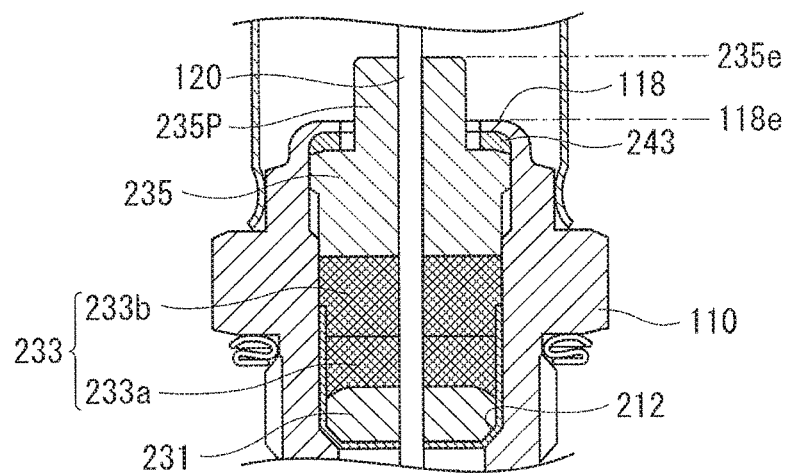
FIG. 4 is an illustration showing a modification of a first ceramic holder.

The present invention is not limited to the above embodiment. For example, as shown in FIG. 4, a tubular protrusion 235p having a reduced diameter may be provided in a rear end portion of a first ceramic holder 235, and a rear end (rearmost end) 235e of the protrusion 235p may protrude rearward from the rear end (rearmost end) 118e of the crimp portion 118. When the protrusion 235p protrudes rearward from the crimp portion 118, the sensor element 120 can have a large holding length. However, if the holding length of the sensor element 120 is large, the sensor element 120 easily breaks when the center axis of the sensor element 120 is misaligned with the center axis of the first ceramic holder 235 during assembly.

Therefore, in terms of preventing breakage of the sensor element, the rear end 135e of the first ceramic holder 135e is preferably flush with the rear end 118e of the crimp portion 118 or is located forward of the rear end 118e, as shown in FIG. 1.

In the example of FIG. 4, a metallic holder 212 is held at the forward end of the internal space of the metallic shell 110, and a second ceramic holder 231 and talc powder 233 are disposed in this order from the forward end side within the metallic holder 212. The talc powder 233 includes first talc 233a disposed within the metallic holder 212 and second talc 233b extending across the rear end of the metallic holder 212. The first talc 233a is charged and compressed within the metallic holder 212, and the sensor element 120 is thereby fixed to the metallic holder 212. The second talc 233b is charged and compressed within the metallic shell 110, and sealing between the outer surface of the sensor element 120 and the inner surface of the metallic shell 110 is thereby ensured. The first ceramic holder 235 is disposed rearward of the second talc 233b.

Figure 5:
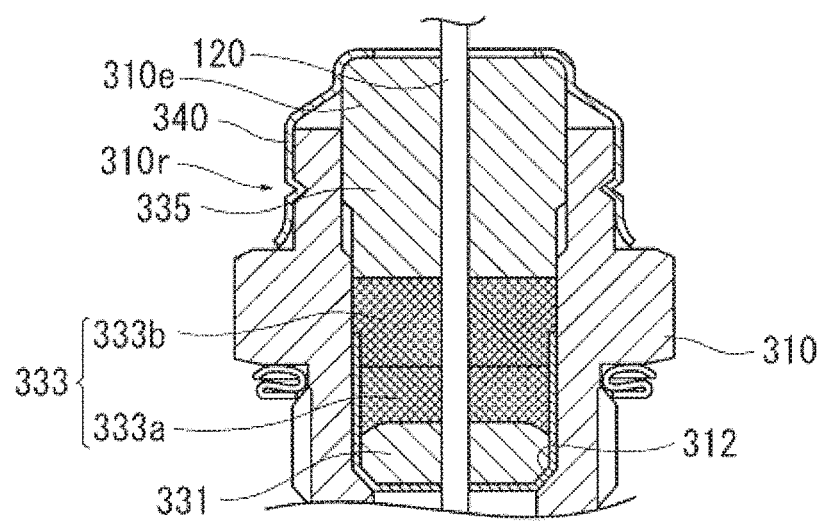
FIG. 5 is an illustration showing a modification of force application means.

The force application means is not limited to the crimp portion 118. For example, as shown in FIG. 5, a metal cap 340 may be used as the force application means, and a rear end portion 310e of a metallic shell 310 may be covered with the metal cap 340.

In this case, for example, a recessed portion 310r is formed in advance along the outer circumferential surface of the rear end portion 310e of the metallic shell 310, and the metal cap 340 is fitted onto a first ceramic holder 335 from its rear end side such that the sensor element 120 protrudes rearward from an insertion hole of the metal cap 340. Then, the circumferential wall of the metal cap 340 is radially inwardly crimped so as to engage the recessed portion 310r, and the metal cap 340 is thereby fixed to the metallic shell 310. Then an appropriate outer tube similar to the outer tube 151 shown in FIG. 1 is externally fitted so as to surround the metal cap 340.

A metallic holder 312, a second ceramic holder 331, and talc powder 333 (including first talc 333a and second talc 333b) are the same as the metallic holder 212, the second ceramic holder 231, and the talc powder 233 (including first talc 233a and second talc 233b), respectively, in FIG. 4.

The present invention is not limited to the embodiments described above, and is applicable to any gas sensor having a plate-shaped sensor element. The present invention encompasses various modifications and equivalents within the spirit and scope of the present invention. For example, the present invention may be applied to NOx sensors (NOx sensor elements) for detecting the concentration of NOx in measurement gas, HC sensors (HC sensor elements) for detecting the concentration of HC, etc.

The powder filler member is not limited to talc, and any powder formed of an inorganic material may be used.

Example 1

Plate-shaped oxygen sensors 100 having the structure shown in FIGS. 1 and 2 were assembled. The talc powder 133 was formed of talc, and the first ceramic holder 135 and the second ceramic holder 131 were formed of alumina. Different amounts of the talc powder 133 were charged into metallic shells 110 to produce a plurality of oxygen sensors 100 with different (L−M)/L values.

The sealing performance of each of the oxygen sensors 100 was evaluated from measurement of leakage from a lower assembly. Specifically, the lower assembly was prepared by attaching the sensor element 120 and the protector 160 shown in FIG. 1 to the metallic shell 110 shown in FIG. 1, and air was introduced into the lower assembly from the protector 160 side at a pressure of 0.6 MPa. When the total amount of air leakage from the gap between the sensor element 120 and the talc powder 133 and from the gap between the talc powder 133 and the metallic shell 110 was 0.3 cc/min or less, the sealing performance was rated "good." The sealing performance was rated "poor" when the amount of air leakage was greater than 0.3 cc/min.

Each of the oxygen sensors 100 was subjected to an element breakage test, and the occurrence of sensor element 120 breakage was checked. Specifically, a determination was made as to whether or not breakage occurred when the sensor element 120 was attached to the oxygen sensor 100. When breakage occurred even in one oxygen sensor, a "poor" rating was assigned.

The results obtained are shown in Table 1.

TABLE 1

|  | (L − M)/L | Sealing performance | Breakage of sensor element | Overall rating |
|---|---|---|---|---|
| Test Example 1 | 0.30 | Good | Poor | Poor |
| Test Example 2 | 0.40 | Good | Poor | Poor |
| Test Example 3 | 0.41 | Good | Good | Good |
| Test Example 4 | 0.50 | Good | Good | Good |
| Test Example 5 | 0.57 | Good | Good | Good |
| Test Example 6 | 0.58 | Poor | Good | Poor |
| Test Example 7 | 0.62 | Poor | Good | Poor |

As is clear from Table 1, in Test Examples 3 to 5 in which the relation 0.40<(L−M)/L<0.58 is satisfied, the sealing performance was good, and the sensor element did not break, so that the overall rating was good.

However, in Test Examples 1 and 2 in which (L−M)/L≤0.40, breakage of the sensor element occurred, and the overall rating was poor. This may be because, since the length M of the talc powder 133 is excessively large with respect to the pressing length L, an excessively large load is applied to the sensor element 120 when the talc powder 133 is compressed.

In Test Examples 6 and 7 in which (L−M)/L≥0.58, the length M of the talc powder 133 is excessively small with respect to the pressing length L. In this case, the sealing length was small, so that the sealing performance deteriorated.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2017-012755 filed Jan. 27, 2017, the disclosure of which is incorporated herein by reference in its entirety.

What is claimed is:

1. A gas sensor comprising:
   a sensor element that extends in a direction of an axial line and includes a detection section disposed at a forward end thereof;
   a tubular metallic shell that internally holds the sensor element;
   a powder filler member that is formed of an inorganic material and seals a gap between the sensor element and the metallic shell;
   a tubular first ceramic holder that is in contact with a rear end of the powder filler member and disposed between the sensor element and the metallic shell, the sensor element protruding rearward from the first ceramic holder; and
   a tubular second ceramic holder that is in contact with a forward end of the powder filler member and disposed between the sensor element and the metallic shell, the sensor element protruding forward from the second ceramic holder,
   wherein the powder filler member has a higher thermal expansion coefficient than that of the first ceramic holder and the second ceramic holder,
   wherein the first ceramic holder, the powder filler member, and the second ceramic holder are fixed while being pressed by force application means from a rear end side of the metallic shell toward a forward end side of the metallic shell, the force application means including a rear end portion of the metallic shell, the rear end portion being bent inward to apply pressing force directly or indirectly to a rearward-facing surface of the first ceramic holder, and
   wherein a relation 0.41≤(L−M)/L≤0.57 holds, where L is a distance, in the direction of the axial line, between the rearward-facing surface of the first ceramic holder and a forward end of the second ceramic holder, and M is a length of the powder filler member in the direction of the axial line, which is between a forward end of the powder filler member and a rearward end of the powder filler member,
   wherein the rearward-facing surface of the first ceramic holder is a rearmost point of a portion of the first ceramic holder pressed by the force application means,
   wherein the forward end of the second ceramic holder is a forwardmost point of a portion of the second ceramic holder, which portion is in contact with the metallic shell, wherein the rear end of the powder filler member in the direction of the axial line is a midpoint, in the direction of the axial line, between a forwardmost end and a rearmost end of a portion of the first ceramic holder in contact with the powder filler member, and wherein the forward end of the powder filler member in the direction of the axial line is a midpoint, in the direction of the axial line, between a forwardmost end and a rearmost end of a portion of the second ceramic holder in contact with the powder filler member.

2. The gas sensor as claimed in claim 1, wherein a rear end of the first ceramic holder is flush with a rear end of the force application means or is located forward of the rear end of the force application means.

3. The gas sensor as claimed in claim 1, wherein a length of the second ceramic holder in the direction of the axial line is larger than a length of the first ceramic holder in the direction of the axial line.

4. The gas sensor as claimed in claim 2, wherein a length of the second ceramic holder in the direction of the axial line is larger than a length of the first ceramic holder in the direction of the axial line.

\* \* \* \* \*